United States Patent [19]

Tagawa et al.

[11] Patent Number: 4,866,515

[45] Date of Patent: Sep. 12, 1989

[54] PASSENGER SERVICE AND ENTERTAINMENT SYSTEM FOR SUPPLYING FREQUENCY-MULTIPLEXED VIDEO, AUDIO, AND TELEVISION GAME SOFTWARE SIGNALS TO PASSENGER SEAT TERMINALS

[75] Inventors: Koichi Tagawa, Tokyo; Atsushi Matsuzaki; Masakatsu Toyoshima, both of Kanagawa; Yoshiyuki Kondo, Tokyo, all of Japan

[73] Assignee: Sony Corporation, Tokyo, Japan

[21] Appl. No.: 148,696

[22] Filed: Jan. 26, 1988

[30] Foreign Application Priority Data

Jan. 30, 1987 [JP] Japan .................................. 62-19981

[51] Int. Cl.$^4$ ......................... H04N 7/08; H04N 7/12
[52] U.S. Cl. ......................................... 358/86; 455/3; 358/254
[58] Field of Search ...................... 381/86; 358/86, 93, 358/115, 254, 255; 297/146, 161, 191; 340/988, 945, 965; 455/3, 4, 5, 6

[56] References Cited

U.S. PATENT DOCUMENTS

| | | |
|---|---|---|
| 3,602,891 | 8/1971 | Clark et al. . |
| 3,757,225 | 9/1973 | Ulicki . |
| 3,997,718 | 12/1976 | Ricketts et al. . |
| 4,247,106 | 1/1981 | Jeffers et al. . |
| 4,428,078 | 1/1984 | Kuo . |
| 4,513,315 | 4/1985 | Dekker et al. . |
| 4,521,021 | 6/1985 | Dixon . |
| 4,554,579 | 11/1985 | Citta . |
| 4,573,072 | 2/1986 | Freeman ................................ 358/86 |
| 4,584,603 | 4/1986 | Harrison . |
| 4,591,906 | 5/1986 | Morales-Garza et al. . |
| 4,647,980 | 3/1987 | Steventon et al. . |
| 4,684,981 | 8/1987 | Toyoshima et al. . |

FOREIGN PATENT DOCUMENTS

| | | |
|---|---|---|
| 103438 | 3/1984 | European Pat. Off. . |
| 144770 | 6/1985 | European Pat. Off. . |
| 54-105499 | 7/1979 | Japan . |
| 57-199369 | 12/1982 | Japan . |
| 59-15387 | 1/1984 | Japan . |
| 59-15388 | 1/1984 | Japan . |

OTHER PUBLICATIONS

"Design Technique for Multiplexing Asynchronous Digital Video and Audio Signal", by J. H. Stott, IEEE Transactions on Communications, vol. COM-26, No. 5, May 1987.

Boeing Electronics Company Brochure Entitled "Putting the Future of Passenger Services and Entertainment at your Fingertips", 1987, six pages.

Boeing, "Proceedings of the SCAR Conference—Part 2", Mar. 1977, pp. 854 and 864.

Primary Examiner—Tommy P. Chin
Attorney, Agent, or Firm—Philip M. Shaw, Jr.

[57] ABSTRACT

A service and entertainment system for transmitting video signals, audio signals and television game software signals from a central transmitting apparatus to each of a plurality of terminal units mounted at respective passenger seats in a passenger vehicle such as aircraft or the like, or at respective seats in a stadium, a theater, or the like. The video signals, audio signals and television game software signals are frequency-multiplexed and then transmitted to the terminal units, so that desired ones of the frequency-multiplexed signals can be selected at each terminal unit.

20 Claims, 4 Drawing Sheets

SELECTION & DISPLAY APPARATUS

PASSENGER SERVICE AND ENTERTAINMENT SYSTEM FOR SUPPLYING FREQUENCY-MULTIPLEXED VIDEO, AUDIO, AND TELEVISION GAME SOFTWARE SIGNALS TO PASSENGER SEAT TERMINALS

BACKGROUND OF THE INVENTION

1. Field of the Invention

The invention relates generally to apparatus for transmitting a plurality of video and audio signals in parallel to each of a plurality of remote terminal units each of which may be located at or near a passenger seat of a passenger vehicle such as an aircraft, a train, a bus, or the like, or at or near a seat in a stadium or theater or the like. More particularly, this invention relates to a service and entertainment system for a passenger vehicle, a stadium, a theater, or the like having a plurality of seats.

2. Description of the Prior Art

It has been proposed, for example, in U.S. Pat. No. 4,584,603, issued Apr. 22, 1986 to Harrison, that video displays be mounted separately on passenger seats of a passenger vehicle, such as an aircraft. In the system of U.S. Pat. No. 4,584,603, a video display is mounted on each of plurality of passenger seats and a plurality of video signals, video game software signals and flight information signals are transmitted in parallel to these video displays. The video display at each seat selects one of these signals and displays the selected signal.

In the system of U.S. Pat. No. 4,584,603, each signal supplied to the video displays is transmitted through a plurality of independent transmission lines (one transmission line for each respective video display). In order to transmit many signals to each display, many transmission lines are required for each display. Accordingly, the system wiring is very complicated and the arrangement of the overall system is also very complicated.

Another aircraft passenger television system, in which video programs can be selected by displays mounted on respective passenger seats, has been disclosed in U.S. Pat. No. 4,647,980, issued Mar. 3, 1987 to Steventon, et al. The aircraft passenger television system of U.S. Pat. No. 4,647,980, however, is incapable of two-way signal transmission between a central unit and each of a plurality of remote units mounted on passenger seats, and is incapable of transmitting signals other than video programs from a central unit to a plurality of remote units. The system of U.S. Pat. No. 4,647,980 offers a menu of programs that is too limited for the U.S. Pat. No. 4,647,980 system to be used as a broad-menu service and entertainment system for passengers.

SUMMARY OF THE INVENTION

The invention is an improved service and entertainment system for a passenger vehicle, having a simplified arrangement and offering passengers a broad menu of services and entertainments.

In one embodiment, the invention includes
a head end apparatus comprising means for reproducing video signals, means for reproducing audio signals, means for storing television game software signals, digital encoder means for digitally encoding the audio signals and television game software signals, means for modulating the video signals and the encoded audio signals and television game software signals in channels of different frequency bands, respectively, and means for multiplexing the modulated video signals, audio signals and television game software signals;
a plurality of terminal units, each provided at a respective one of a plurality of passenger seats, each said terminal apparatus unit including tuner means for receiving and demodulating the multiplexed video signals, audio signals and television game software signals, decoder means for decoding the encoded audio signals and television game software signals, memory means for storing the television game software signals, means for processing the television game software signals, display means, and means for selecting one of the video signals, audio signals and television game software signals; and
cable means for transmitting the multiplexed video signals, audio signals, and television game software signals to the terminal units.

In another embodiment, the invention includes:
a head end apparatus comprising means for generating video and related audio signals, means for generating separate audio signals, memory means for storing television game software signals, digital encoder means for digitally encoding all of said audio signals and said television game software signals, means for modulating said video signals and the output signal of said digital encoder means, and multiplexer means connected to said modulator means for multiplexing the modulated video signals, audio signals, and television game software signals;
a plurality of terminal units each provided at respective one of said passenger seats, each said terminal unit comprising a first tuner means for receiving said video signals, a second tuner means for receiving the audio signals related to said video signals, said separate audio signals, and said television game software signals, a decoder means for decoding the output signal of said second tuner means, a selecting means for selecting said video and related audio signals, said separate audio signals, or said television game software signals, a display means, an audio output terminal, a volume control means, and a means for processing said television game software signals; and
means for transmitting multiplexed signals from the head end apparatus to the plurality of terminal units.

These and other features and advantages of the invention will become apparent from the following detailed description of the preferred embodiments that is to be taken in conjunction with the accompanying drawings, throughout which like references designate like elements and parts.

DESCRIPTION OF THE PREFERRED EMBODIMENTS

Several embodiments of a service and entertainment system according to the present invention will now be described with reference to the attached drawings.

The "transmitting side" (also referred to as the "central control portion" or "central control unit") of invention will first be described with reference to FIG. 1.

Figure 1:
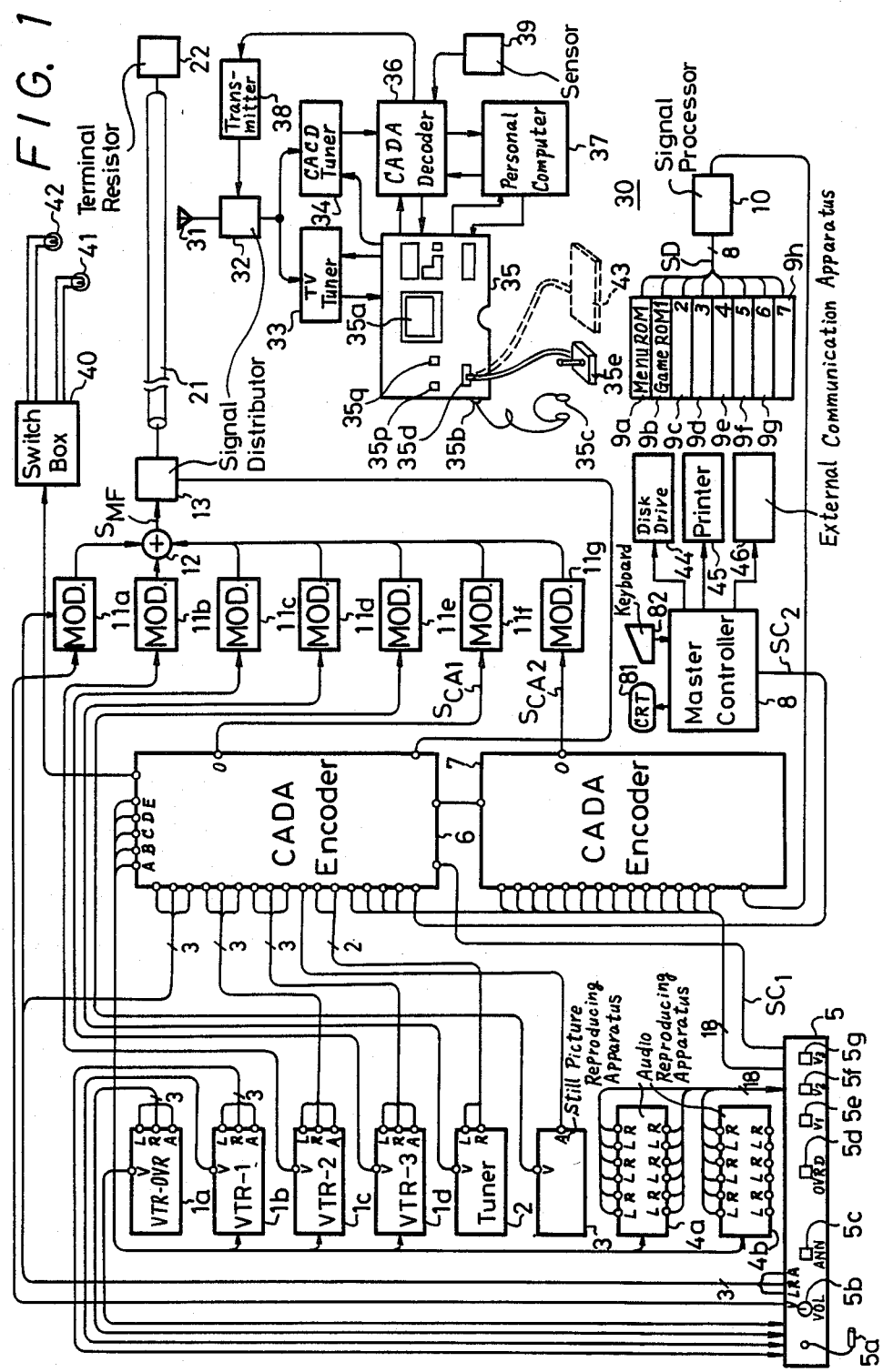
FIG. 1 is a circuit block diagram showing the whole arrangement of an embodiment of a service and entertainment system according to the present invention.

In FIG. 1, reference numerals 1a to 1d designate video tape recorders provided in the transmitting side. The transmitting side may be located in an aircraft crew's room. Video tape recorder 1a is used for an override operation and may be loaded with a cassette tape explaining how to put on a life-jacket or the like. Each of video tape recorders 1b to 1d is loaded with a cassette tape of a video program such as a movie. Each of video tape recorders 1a to 1d is respectively provided with a terminal V for outputting a reproduced video signal and with terminals L, R and A for outputting reproduced audio signals. In an embodiment in which video tape recorders 1a to 1d store bi-lingual programs, terminals L and R are used for outputting left-channel and right-channel audio signals in a first language, respectively, and terminal A is used for outputting a monaural audio signal in a second language.

Television tuner 2 is provided with a terminal V for outputting a video signal and terminals L and R for outputting the left and right channels of an audio signal, respectively.

Still picture reproducing apparatus 3 is capable of reproducing still picture information recorded in a compact disk (CD) ROM, such as maps, an airport guiding drawing, or the like. The still picture reproducing apparatus 3 is provided with a terminal V for outputting a video signal representative of a still picture and a terminal A for outputting an audio signal associated with the still picture.

Audio reproducing apparatus 4a and audio reproducing apparatus 4b each include three sets of compact disk players (CD players) and tape recorders. The audio reproducing apparatus 4a, 4b are respectively provided with six pairs of terminals L and R for outputting left channel and right channel audio signals.

Controller 5 comprises a microphone 5a, a volume control 5b for adjusting the level of an audio signal received at the microphone 5a, an announce key 5c, an override key 5d and pause keys 5e to 5g for setting the video tape recorders 1b into pause mode. Video signals from the respective terminals V of the video tape recorders 1a, 1b and audio signals from the respective terminals L, R and A of these recorders are supplied to controller 5. Controller 5 is provided with a terminal V for outputting a video signal and terminals L, R and A for outputting audio signals. Usually, the terminals V, L, R and A of the controller 5 output the video signal supplied from terminal V of the video tape recorder 1b and the audio signals supplied from terminals L, R and A of video tape recorder 1b. However, when the override key 5d is pressed to trigger the override operation, the terminals V, L, R and A of the controller 5 output the video signal supplied from terminal V of video tape recorder 1a and audio signals supplied from terminals L, R and A of video tape recorder 1a. When the announce key 5c is pressed to initiate the announce operation, an audio signal from microphone 5a is delivered to the output terminal A of controller 5.

CADA encoders 6 and 7 are of the type used in the conventional cable digital audio/data transmission system (CADA system) disclosed in U.S. Pat. No. 4,684,981 issued Aug. 4, 1987. The CADA encoders are capable of time-division-multiplexing a plurality of digital audio and data signals and transmitting the multiplexed signals over a vacant one channel band width (6 MHz) of a CATV, thus transmitting signals (e.g., music) with high efficiency without damaging their quality. Each of CADA encoders 6 and 7 is provided with an A/D (analog-to-digital) converter and a shift register. The time-division-multiplexing operation is carried out by converting a plurality of audio signals into digital signals in the A/D converter, inputting the digital signals in parallel to the shift register at predetermined locations, and then outputting the digital signals from the shift register in series at a high speed. Not only digital audio signals but also control data and data comprising computer software can be multiplexed by the CADA encoders in this manner.

The audio signals delivered to the output terminals L, R and A of controller 5 are supplied to encoder 6. The audio signals delivered to the output terminals L, R and A of the video tape recorders 1c and 1d are also supplied to encoder 6. The audio signals delivered to the output terminals L and R of the tuner 2 and the output terminal A of the still picture reproducing apparatus 3 are also supplied to encoder 6. The audio signals delivered to the six pairs of output terminals L and R of audio reproducing apparatus 4a and the six pairs of output terminals L and R of audio reproducing apparatus 4b are supplied to encoders 6 and 7 through controller 5.

When one of the override key 5d, the announce key 5c, and the pause keys 5e to 5g of the controller 5 is pressed, the controller 5 generates control data $SC_1$ having contents corresponding to the pressed key. The control data $SC_1$ is supplied to the encoder 6.

Encoder 6 has output terminals A to E from each of which a pause control signal is outputted in response to the control data $SC_1$. The video tape recorders 1b to 1d and the audio reproducing apparatus 4a and 4b are respectively controlled by the pause signals delivered from the terminals A to E of the encoder 6. More specifically, when the override key 5d and the announce key 5c are pressed, the pause control signal is outputted from all of the terminals A to E, so that the video tape recorders 1b to 1d and the audio reproducing apparatus 4a and 4b all enter a pause mode. When the pause keys 5e to 5g are pressed, pause control signals are outputted from output terminals A to C, placing the video tape recorders 1b to 1d into a pause mode, respectively.

A master controller 8 is provided. Master controller 8 comprises a computer which controls the overall system, and is preferably located in the cabin of the aircraft. Master controller 8 is connected with a display 81 and a keyboard 82. Master controller 8 generates control data $SC_2$ (for controlling one or more terminal apparatus units located in the receiving side of the system) in response to a command from keyboard 82 and supplies control data $SC_2$ to encoder 6. The control data $SC_2$ may be, for example, data for controlling the luminance of a display in the terminal apparatus, data for polling the conditions of each passenger seat at which a terminal apparatus is located, or other data. The data can be monitored by the display 81 connected to the master controller 8.

Menu data is written in ROM 9a, and a different set of game data is written in each of ROMs 9b to 9h. Each data signal SD read out from the ROMs 9a to 9h (for example, for use with computer software) is supplied to a signal processing circuit 10 in which, for example, an error correcting code may be added thereto, and is supplied to encoder 7 thereafter.

Control data signals $SC_1$ and $SC_2$ are supplied also to the encoder 7 from the encoder 6.

A time-division-multiplexed signal $S_{CA1}$ emerges from output terminal 0 to encoder 6. Signal $S_{CA1}$ includes the plurality of digitally converted audio signals generated in encoder 6, and the control data $SC_1$ and $SC_2$ supplied to encoder 6. The signal $S_{CA1}$ is supplied to a modulator 1f to be amplitude-modulated, preferably by a VSB (vestigial sideband) system.

A time-division-multiplexed signal $S_{CA2}$ emerges from an output terminal of 0 of the encoder 7. Signal $S_{CA2}$ includes the plurality of digitally converted audio signals generated in encoder 7, and the control data ($SC_1$ and $SC_2$) and the signal SD supplied to encoder 7. The signal $S_{CA2}$ is supplied to modulator 11g to be amplitude-modulated, preferably by a VSB system.

The video signal delivered to the output terminal V of controller 5 is supplied to modulator 11a. The audio signal delivered to the terminal A of controller 5 is supplied both to modulater 11a and to encoder 6. In modulator 11a, an ordinary television signal is generated by frequency modulating the audio signal and frequency-multiplexing the frequency modulated audio signal with the video signal. This television signal is thereafter amplitude-modulated, preferably by a VSB system.

The video signals delivered to the respective output terminals V of the video tape recorders 1c, 1d, the tuner 2, and the still picture reproducing apparatus 3 are respectively supplied to modulators 11b to 11e to be amplitude-modulated, preferably by a VSB system.

The modulators 11a to 11g modulate the signals supplied thereto in frequency bands chosen so as to prevent cross modulation, such as in every other channel above the 60 channels of the television broadcasting band.

Output signals from the modulators 11a to 11g are supplied to an adder 12 in which they are frequency-multiplexed. The frequency-multiplexed signal $S_{MF}$ from the adder 12 is supplied through a signal distributor 13 to one end of a leaky cable 21. Cable 21 serves as a bi-directional signal transmission means. The other end of leaky cable 21 terminates at terminal resistor 22. A coaxial cable whose periphery is spirally indented so as to leak a large amount of signals is suitable for use as cable 21.

The receiving side of the system of the invention will next be described.

FIG. 1 shows terminal apparatus unit 30, of the type that preferably will be mounted on the back of a plurality of passenger seats in an aircraft. Although only one terminal apparatus unit 30 is illustrated in FIG. 1, preferably there will be the same number of units of apparatus 30 as there are passenger seats in the aircraft. The terminal apparatus 30 is provided with an antenna 31 which receives the frequency multiplexed signal $S_{MF}$ leaking from the leaky cable 21. The frequency-multiplexed signal $S_{MF}$ received at the antenna 31 is supplied through a signal distributor 32 to a television tuner 33 and a CADA tuner 34. Tuner 33 is capable of selectively receiving channels in the output frequency bands of the modulators 11a to 11e, while the tuner 34 is capable of selectively receiving channels in the output frequency bands of the modulators 11f and 11g. Tuners 33 and 34 are controlled in their channel selections by a selection and display apparatus 35.

Video and audio signals emerging from tuner 33 are supplied to the selection and display apparatus 35, and the time-division-multiplexed signal $S_{CA1}$ or $S_{CA2}$ emerging from tuner 34 is supplied to a CADA decoder 36. The CADA decoder 36 is constructed so as to effect substantially the inverse operations to those performed in CADA encoders 6 and 7. More specifically, CADA decoder 36 decodes the time-division-multiplexed signal $S_{CA1}$ or $S_{CA2}$ or CADA data, produces a desired demultiplexed signal, and supplies the same to selection and display apparatus 35 or personal computer 37. An embodiment of decoder 36 is described in abovereferenced U.S. Pat. No. 684,981.

Figure 2:
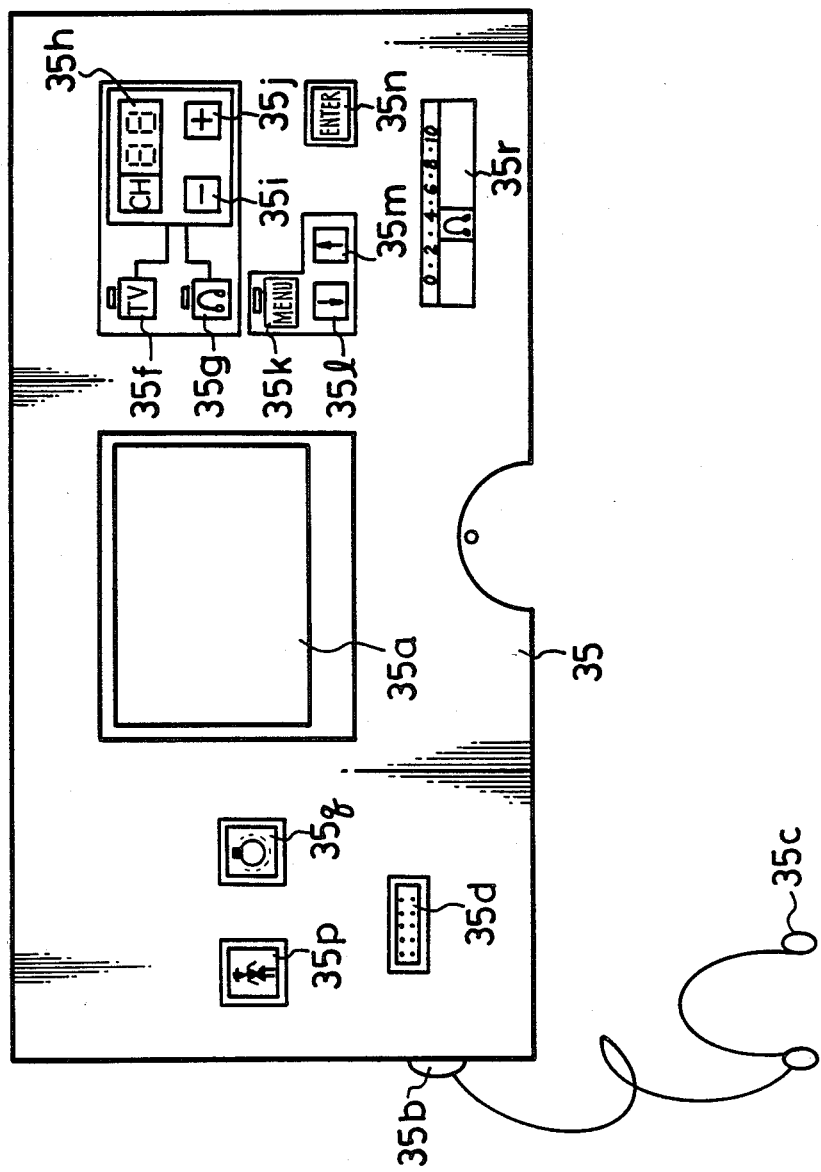
FIG. 2 is an enlarged front view of a front panel of a selection and display apparatus used in the FIG. 1 embodiment.
Figure 3:
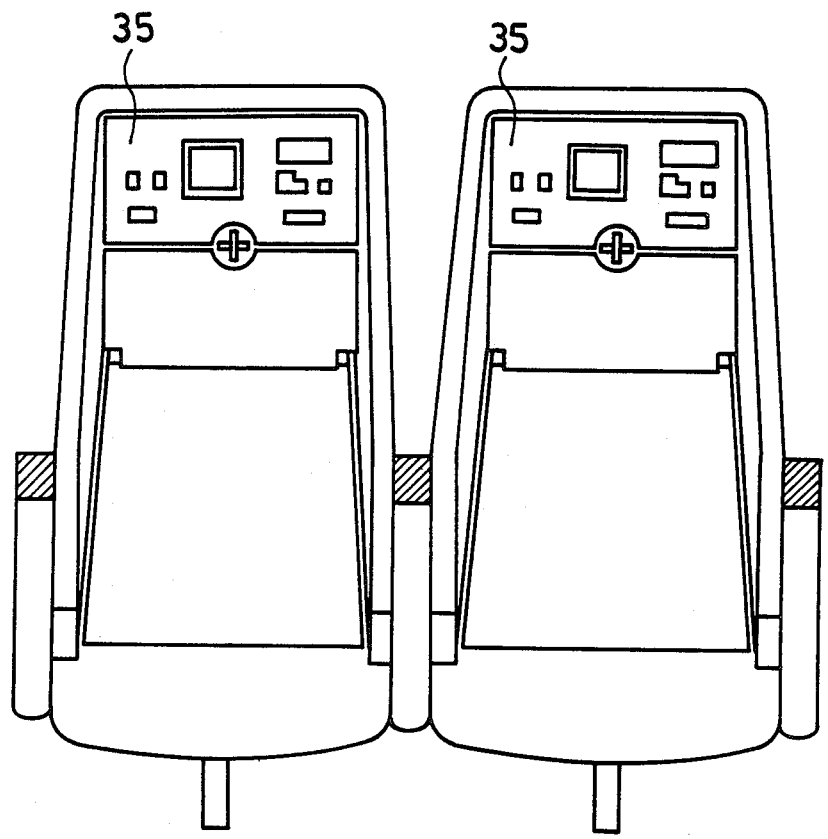
FIG. 3 is a rear view of two units of the selection and display apparatus of the invention, each mounted on a different passenger seat.

FIG. 2 is an example of a preferred arrangement of the panel of selection and display apparatus 35. The panel of selection and display apparatus 35 may be mounted on the back of a passenger seat, as shown in FIG. 3.

FIG. 2 shows a display 35a, which may comprise a flat cathode ray tube or an LCD (liquid crystal display) or the like, an audio output terminal 35b for connecting a pair of head phones 35c thereto, and a game terminal 35d for connecting a joy stick 35e or the like (refer to FIG. 1) for playing games.

Further, the selection and display apparatus 35 is provided with a television selecting key 35f, a music selecting key 35g, a channel display 35h, a channel-down key 35i and a channel-up key 35j.

The television channel can be sequentially changed by first pressing the television selecting key 35f and then pressing the channel-down key 35i or the channel-up key 35j. Thus, when the channel received by the television tuner 33 is changed sequentially, the display 35a sequentially displays images reproduced from the video signals derived from the video tape recorders 1b to 1d, the tuner 2 and the still picture reproducing apparatus 3, and corresponding audio signals from CADA decoder 36 are outputted to the audio output terminal 35b. When the audio signal is bi-lingual, two audio channels are assigned for one video display. A first language is outputted from the first channel; and a second language from the second channel.

The music channel can be sequentially changed by first pressing the music selecting key 35g and then pressing the channel-down key 35i or the channel-up key 35j. In this manner, the audio signal outputted from the CADA decoder 36 is changed, and the audio signals outputted from the audio reproducing apparatus 4a and 4b are sequentially outputted to the audio signal output terminal 35b.

The selection and display apparatus 35 is also provided with a menu display key 35k, a cursor-down key 35l, a cursor-up key 35m and an enter key 35n. By pressing the menu key 35k, a video signal based on data from the menu ROM 9a is supplied to the selection and display apparatus 35 from the personal computer 37 and a menu is displayed on the display 35a.

By pressing the enter key 35n after selecting a game by moving the cursor on the display with the cursor-down key 35l and the cursor-up key 35m, a video signal and an audio signal based on data of the selected game from the game ROMs 9b to 9h are supplied from the personal computer 37 to the selection and display apparatus 35. Then, the game is displayed on the display 35a and the game sound signal is outputted to the audio output terminal 35b.

Selection and display apparatus 35 also includes an attendant call key 35p, a reading light key 35q and a volume control 35r.

Referring again to FIG. 1, in response to control data SC1 and SC2 derived from CADA decoder 36, the selection and display apparatus 35 is controlled by a central processing unit (not shown) located within CADA decoder 36. When control data SC1 indicates that the override mode has been selected (this selection is made by depressing the override key 5d of control apparatus 5 located at the transmission side), tuner 33 is tuned to receive the channel of the output frequency band associated with modulator 11a, so that a picture based on the video signal produced at output terminal V of video tape recorder 1a is displayed on the display apparatus 35a, while the related audio signal produced at output terminal A of video tape recorder 1a is fed to audio output terminal 35b. When control data SC1 indicates that the announce mode has been selected (this selection is made by actuating the announce key 5c of control apparatus 5 located at the transmission side), the tuner 33 is also tuned to receive the channel of the output frequency band associated with modulator 11a, while the audio signal from the microphone 5a is fed to audio output terminal 35b. In the announce mode, the video signal is muted and thus no picture is displayed on the display apparatus 35a. In both the announce mode and the override mode, the sound volume to all terminal units may be controlled so as to remain constant.

If CADA encoder 6 or 7 is disabled, the control data SC1 obtained is the same as the control data SC1 generated to initiate the override mode, so that in this case also, tuner 33 is forcibly placed in the same reception state as that in which it is placed in the override mode.

In the event that tuner 33 is placed in this reception state while a television game is being played, execution of the game by personal computer 37 is interrupted temporarily.

When the announce key 5c is pressed again to terminate the override operation or the announce operation, selection and display apparatus 35 is released from the override condition and is automatically returned to its condition as of initiation of the override or announce operation. At this point, personal computer 37 may resume execution of a television game. When the selection state (reception state) is overridden (forced into a controlled condition) channel indicator 35h displays a signal indicative of the forced condition. Alternatively, a special indicator may be provided to perform this function.

On the basis of control data SC2, the brightness of display apparatus 35a is automatically controlled in accordance with the brightness of the cabin. When control data SC2 requests information regarding a terminal unit, a CPU (not shown) within CADA decoder 36 generates the requested information, which may be indicative of the status of apparatus 35, or data detected by sensors (such as sensor 35) and indicative of whether the seat belts are fastened or not, or indicative of the reclining states of passenger seats or the like. Such data is supplied to transmitter 38, in which it is modulated by a signal having a selected frequency outside the frequency bands of modulator 11a through 11g. Then the modulated data is supplied through signal distributor 32 and antenna 31 to leaky cable 21. The signal transmitted by leaky cable 21 is supplied through the signal distributor 13 to the CADA encoder 6 located at the transmitting side, and is fed through CADA encoder 6 to master controller 8, in which it is utilized.

If the attendant call key 35p of selection and display apparatus 35 is depressed, control data is generated from the CPU of CADA decoder 36. This data is supplied to and modulated by transmitter 38 and the modulated data signal is then fed through the signal distributor 32 and the antenna 31 to leaky cable 21. The data signal from the leaky cable 21 is supplied through signal distributor 13 to CADA encoder 6 at the transmitting side. On the basis of this data, the CPU (not shown) within CADA encoder 6 controls a switch box 41 to light a corresponding attendant call lamp 41 (shown in FIG. 1). If the reading lamp key 35q of selection and display apparatus 35 is actuated, control data is generated from the CPU of the CADA decoder 36. Such data is supplied to the transmitter 38, in which it is modulated and then fed through the signal distributor 32 and antenna 31 to leaky cable 21. The data from the leaky cable 21 is supplied through signal distributor 13 to CADA encoder 6 at the transmitting side. On the basis of this data, the CPU within CADA encoder 6 controls switching box 40 to light a corresponding reading light 42.

Further, if a keyboard 43 is connected to game terminal 35d, as shown by a broken line in FIG. 1, the CPU within CADA decoder 36 produces control data. Such control data is supplied to transmitter 38, in which it is modulated and then fed through the signal distributor 32 and the antenna 31 to the leaky cable 21. The data from the leaky cable 21 is supplied through signal distributor 13 to CADA encoder 6 and is further fed from CADA encoder 6 to master controller 8. When supplied with this data, master controller 8 responds by supplying appropriate computer program data (which may be a word processing program, and will hereinafter be referred to as a word processor program, for specificity) to CADA encoders 6 and 7. This word processor program is then supplied as a frequency-multiplexed signal through the leaky cable 21 to terminal apparatus unit 30 and is then latched into personal computer 37. In this operating mode, if the user enters sentences or other information by operating keyboard 43, such sentences or other information are recorded in a random access memory (RAM) of personal computer 37. Display 35a displays the sentences or other information so that the user can correct them or otherwise process them while viewing them on display 35a. When the correction, or other processing operation, is ended using keyboard 43, data representing the sentences or other information (converted to ASCII code) from the memory of personal computer 37 is transmitted through CADA decoder 36 to the transmitter 38, in which the data is modulated and then fed through the signal distributor 32 and the antenna 31 to the leaky cable 21. The data from the leaky cable 21 is supplied through the signal distributor 13 to the CADA encoder 6 in which it is encoded. The encoded data from the CADA encoder 6 is supplied to the master controller 8. The data may then be supplied to a disk drive 44 in by which it is recorded, for example, in a floppy disk (not shown). Alternatively, the data may be supplied to a printer 45 where it is printed out, or the data may be transmitted to a remote location via a communication apparatus 46. The user can select any one of the disk drive 44, the printer 45 and the communication apparatus 46 by entry of appropriate commands using keyboard 43. Such selection commands are supplied to the master controller 8 together with the other word processing data (such as sentences entered using keyboard 43. The passenger may also utilize any word processor or other program which was previously written in a ROM (not shown) within personal computer 37. The passenger may pick up any record generated in disk drive 44 or any paper record generated by printer 45, for example, when the passenger exits the aircraft.

According to the embodiment of the invention described with reference to FIGS. 1–3, video signals from the video tape recorders 1a to 1d, the tuner 2 and the still picture reproducing apparatus 3, and audio signals from the video tape recorders 1a to 1d, the tuner 2, the still picture reproducing apparatus 3 and the audio reproducing apparatus 4a and 4b, and so on, are frequency-multiplexed (in a time-division manner described in referenced U.S. Pat. No. 4,684,981) and output as signals $S_{CA1}$ and $S_{CA2}$ of CADA encoders 6 and 7. These output signals $S_{CA1}$ and $S_{CA2}$ are respectively modulated by the modulators 11a to 11g and then added together to form the frequency-multiplexed signal $S_{MF}$. This frequency-multiplexed signal $S_{MF}$ is supplied to the leaky cable 21 for transmission to the reception side. Upon reception at each terminal unit 30, the selection and display apparatus 35 may select a desired signal from the plurality of video and audio signals transmitted as the frequency-multiplexed signal $S_{MF}$.

Data generated by actuation of the reading lamp key 35q and the attendant call key 35p, data indicative of the selected status of selection and display apparatus 35 and other data derived from terminal apparatus unit 30, are modulated by transmitter 38 and then supplied through the signal distributor 32 and the antenna 31 to the leaky cable 21. The data from the leaky cable 21 is supplied through the signal distributor 13 to CADA encoder 6. On the basis of this data, the CPU within CADA encoder 6 controls the reading light 42 and the attendant call light 41, for example, to turn each on or off. Alternatively, this data is supplied to master controller 8 in which an audience rating or the like is calculated on the basis of the data supplied.

Figure 4:
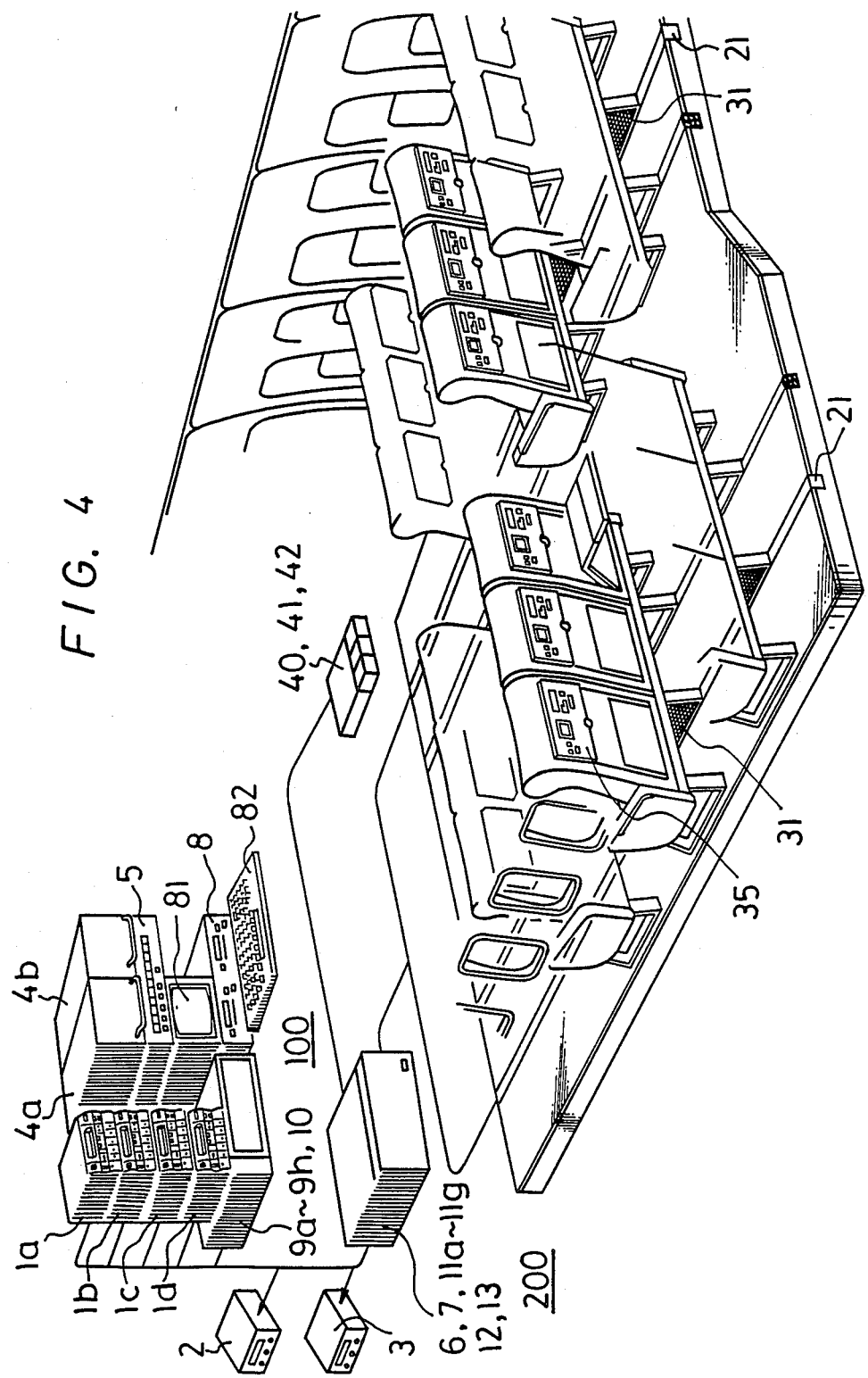
FIG. 4 is a perspective view of a preferred embodiment of the invention.

FIG. 4 shows the appearance of a preferred embodiment of the present invention which is installed in a aircraft. The parts in the FIG. 4 system corresponding to those of FIG. 1 are marked with the same reference numerals and will not be described again in detail. The disk drive 44, the printer 45 and the external communication apparatus 46 shown in FIG. 1 are not shown in FIG. 4 for simplicity. ROMs 9a to 9h and signal processing circuit 10 shown in FIG. 1 are all secured in box 100, while CADA encoders 6 and 7, modulators 11a to 11g, adder 12, and signal distributor 13 are all secured in box 200.

Since the plurality of video signals, audio signals, and television game software signals to be transmitted by the invention are frequency-multiplexed at the transmission side and supplied through leaky cable 21 to each terminal apparatus unit 30 on the reception side, the overall arrangement of the invention is simple, and the signal transmission components are particularly simple, compact, and lightweight. This is particularly advantageous in an aircraft which desirably has a low weight.

According to the invention, a desired one of a plurality of different video programs, such as movies, digitally reproduced music, and television games can be enjoyed at every passenger seat. The invention is thus suitable for use as a service and entertainment system for a passenger vehicle (such as an aircraft) having a plurality of passenger seats.

Further, according to the present invention, since the audio signals are digitized for transmission as digital signals by CADA encoders 6 and 7, each user can enjoy music having excellent tone quality, which quality is uniform among the terminal units 30 at the reception side.

While the present invention is useful as an information transmitting apparatus or service and entertainment system within the cabin of an aircraft as described above, the invention is not limited for use for this purpose, and instead can be implemented in other kinds of passenger vehicles (such as a train or a bus), or in a theater, stadium, or the like.

While each selection and display apparatus 35 is shown mounted on the rear side of a passenger seat in FIGS. 3 and 4, each selection and display apparatus 35 may alternatively be provided at other locations near the user, for example, at the arm portion of the user's seat, or a table portion contained in the user's seat. Alternatively, the selection portion of the terminal apparatus can be provided at the user's arm rest while the display portion is provided on the rear side of the seat ahead of the user.

According to the present invention, since a plurality of video signals and audio signals (and other signals) are frequency-multiplexed and then transmitted through single signal transmitting means, and since the data generated at the reception side is transmitted through the same single signal transmitting means to the transmission side, the system wiring is simple and the hardware for implementing the invention can be simplified. This enhance the suitability of the service and entertainment system of the invention for use as an information transmitting apparatus for a passenger vehicle, or as a service and information transmitting apparatus located within a theater, stadium or the like.

Although several preferred embodiments of the invention have been described, it will be apparent that many modifications and variations could be effected by one skilled in the art without departing from the spirit or scope of the invention, as claimed below.

We claim as our invention:

1. A service and entertainment system for supplying frequency-multiplexed signals to a plurality of passenger seats, comprising:

a head end apparatus comprising means for reproducing video signals, means for reproducing audio signals, means for storing television game software signals, encoder means for digitally encoding said audio signals and said television game software signals, means for modulating said video signals and said encoded audio signals and encoded television game software signals in channels of different frequency bands, respectively, and means for multiplexing said modulated video signals, modulated, encoded, audio signals, and modulated, encoded, television game software signals, respectively;

cable means for transmitting said multiplexed, modulated video signals, encoded audio signals, and encoded television game software signals; and a plurality of terminal units each positioned at a different one of the passenger seats away from the head end apparatus, each said terminal unit including a means for selecting at least one of said multiplexed, modulated video signals, encoded audio signals, and encoded television game software signals, a tuner coupled to the selecting means for receiving and demodulating said selected multiplexed, modulated video signals, encoded audio signals, and encoded television game software signals, a decoder means for decoding the selected demodulated encoded audio signals and the selected demodulated television game software signals, a display means for displaying the selected demodulated video signals, an audio output terminal for receiving the selected decoded demodulated audio signals, and a means for storing and processing the selected, decoded, demodulated television game software signals.

2. A service and entertainment system according to claim 1, in which said audio signals are analog audio signals and said encoder means converts said analog audio signals to digital audio signals prior to encoding said audio signals therein, and said decoder means converts said digital audio signals to analog audio signals prior to decoding said audio signals therein.

3. A service and entertainment system according to claim 2, in which each said terminal unit further comprises antenna means for receiving said multiplexed video signals and audio signals, and a signal distributor connected between said antenna means and said tuner, and each said tuner includes a first tuner for receiving said video signals and a second tuner for receiving said audio signals.

4. A service and entertainment system according to claim 2, in which said video signal reproducing means includes a plurality of video cassette recorders and a means for reproducing still video pictures.

5. A service and entertainment system according to claim 4, in which said video signal reproducing means further includes a television tuner.

6. A service and entertainment system according to claim 4, in which each of said video cassette recorders and said still video picture reproducing means has a video output terminal and an audio output terminal, each said video output terminal being connected to said modulator means and each said audio output terminal being connected to said encoder means.

7. A service and entertainment system according to claim 1, in which each said terminal unit further comprises a game terminal to which a game controller may be connected, wherein the game terminal is connected to the means for storing and processing the selected, decoded, demodulated television game software signals.

8. A service and entertainment system according to claim 1, in which said selecting means comprises a channel indicator, a set of channel up and down keys for use in selecting any one of said multiplexed, modulated video signals and said multiplexed, modulated encoded audio signals, and a game selecting key for selecting any one of said encoded television game software signals.

9. A service and entertainment system according to claim 8, in which each said terminal unit further comprises a volume control for controlling the volume of the selected decoded audio signals received at the audio output terminal.

10. A service and entertainment system according to claim 9, further comprising an attendant call light and a reading light provided for each said terminal unit wherein said head end apparatus further comprises control means for controlling each said attendant call light, and wherein each said terminal unit comprises an attendant call key, a reading light key, means for generating a control signal by actuation of said attendant call key and said reading light key, and means for sending said control signal to said control means in said head end apparatus through said cable means.

11. A service and entertainment system according to claim 10, in which each said terminal unit comprises a panel including said display means, said channel indicator, said channel up and down keys, said game selecting key, said volume control, said attendant call key and said reading light key.

12. A service and entertainment system according to claim 11, in which each said panel is adapted to be mounted on a rear side of one of the passenger seats, and each of the passenger seats is mounted in a passenger vehicle.

13. A service and entertainment system according to claim 11, in which said display means is a flat cathode ray tube.

14. A service and entertainment system according to claim 11, in which said display means is a liquid crystal display.

15. A service and entertainment system according to claim 1, in which the passenger seats are mounted in a passenger vehicle.

16. A service and entertainment system for a passenger vehicle having a plurality of passenger seats, comprising:

a head end apparatus comprising means for generating video and related audio signals, means for generating separate audio signals, means for storing television game software signals, encoder means for digitally encoding all of said audio signals and said television game software signals, means for modulating said video signals and the output signal of said encoder means, and multiplexer means connected to said modulating means for multiplexing the modulated video signals, the modulated encoded audio signals and modulated encoded television game software signals;

a plurality of terminal units each provided at respective one of said passenger seats, each said terminal unit comprising a selecting means for selecting at least one of said multiplexed, modulated video and related encoded audio signals, said multiplexed, modulated separate encoded audio signals, and said multiplexed, modulated, encoded television game software signals, a first tuner means for receiving and demodulating said selected video signals, a second tuner means for receiving and demodulating said selected related encoded audio signals, said selected separate encoded audio signals, and said selected encoded television game software signals, wherein each of said first tuner means and said second tuner means is coupled to the selecting means, a decoder means for decoding the output signal of said second tuner means, a display means for displaying the selected, demodulated video signals, an audio output terminal for receiving the decoded, demodulated audio signals output from the decoder means, a volume control for controlling the amplitude of the decoded, demodulated audio signals received at the audio output terminal, and means for storing and processing the decoded, demodulated television game software signals output from the decoder means; and means for transmitting said modulated, multiplexed signals from the head end apparatus to each said terminal unit.

17. A service and entertainment system according to claim 16, in which said transmitting means includes a leaky cable.

18. A service and entertainment system according to claim 16, in which each terminal unit comprises a panel including said selecting means, said display means, said audio output terminal and said volume control.

19. A service and entertainment system according to claim 18, in which said panel is mounted on the rear side of one of said passenger seats.

20. A service and entertainment system according to claim 19, in which said passenger vehicle is an aircraft.

* * * * *